United States Patent
Khoury et al.

(10) Patent No.: US 9,894,043 B2
(45) Date of Patent: Feb. 13, 2018

(54) CRYPTOGRAPHICALLY SECURE CROSS-DOMAIN INFORMATION SHARING

(71) Applicant: Raytheon BBN Technologies Corp., Cambridge, MA (US)

(72) Inventors: Joud Khoury, Boston, MA (US); William Timothy Strayer, West Newton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 139 days.

(21) Appl. No.: 14/958,089

(22) Filed: Dec. 3, 2015

(65) Prior Publication Data

US 2017/0093817 A1 Mar. 30, 2017

Related U.S. Application Data

(60) Provisional application No. 62/235,244, filed on Sep. 30, 2015.

(51) Int. Cl.
*H04L 29/00* (2006.01)
*H04L 29/06* (2006.01)
(Continued)

(52) U.S. Cl.
CPC .......... *H04L 63/0471* (2013.01); *G06F 21/62* (2013.01); *H04L 9/006* (2013.01); *H04L 9/3073* (2013.01); *H04L 63/105* (2013.01)

(58) Field of Classification Search
CPC ..... H04L 63/0471; H04L 63/105; H04L 9/14; H04L 9/006; H04L 9/3073; G06F 21/60; G06F 21/62
See application file for complete search history.

(56) References Cited

U.S. PATENT DOCUMENTS 8,516,244 B2 * 8/2013 Waters .................. H04L 9/3073
713/155
8,880,875 B1 11/2014 Waters
(Continued)

OTHER PUBLICATIONS

"Advanced Encryption Standard (AES)", Federal Information Processing Standards Publication 197, (Nov. 26, 2001), 51 pgs.
(Continued)

*Primary Examiner* — Kendall Dolly
(74) *Attorney, Agent, or Firm* — Schwegman Lundberg & Woessner, P.A.

(57) ABSTRACT

Techniques for cryptographically secure, cross-domain information sharing are described. A first information domain including a first attribute-based encryption (ABE) authority defines a first universe of ABE attributes. Plaintext is encrypted using ABE encryption, producing ABE ciphertext. The ABE encryption uses an ABE access control expression defined with a set of ABE attributes comprising a first ABE attribute subset from the first universe of ABE attributes and second ABE attribute subset from a second universe of ABE attributes defined by a second ABE authority of a second information domain. The ABE ciphertext and the ABE access control expression are combined to produce an ABE package. The ABE package is encrypted, using predicate-based encryption (PBE), producing a PBE ciphertext. The PBE encryption uses a first set of PBE attributes from a universe of PBE attributes defined by a PBE authority.

17 Claims, 7 Drawing Sheets

(51) Int. Cl.
*G06F 21/62* (2013.01)
*H04L 9/00* (2006.01)
*H04L 9/30* (2006.01)

(56) References Cited

U.S. PATENT DOCUMENTS

| | | | |
|---|---|---|---|
| 9,077,525 B2* | 7/2015 | Chandran | H04L 9/088 |
| 2009/0080658 A1* | 3/2009 | Waters | G06F 21/6218 |
| | | | 380/277 |
| 2012/0027210 A1* | 2/2012 | Takeuchi | H04L 9/0861 |
| | | | 380/255 |

OTHER PUBLICATIONS

"Information technology—Open Systems Interconnection—The Directory: Public-key and attribute certificate frameworks", Telecommunication Standardization Sector of ITU x.509, (Aug. 2005), 174 pgs.

Bell, David Elliott, et al., "Secure Computer Systems: Mathematical Foundations", MITRE Corporation Technical Report 2547, (Mar. 1973), 33 pgs.

Boneh, D., "Conjunctive, subset, and range queries on encrypted data", Proceedings of the 4th conference on Theory of cryptography, ser. TCC'07. Berlin, Heidelberg: Springer-Verlag, (29 pgs), 2007.

Cooper, D., "Internet X.509 Public Key Infrastructure Certificate and Certificate Revocation List (CRL) Profile", RFC-5280, (May 2008), 151 pgs.

Galbraith, Steven D., et al., "Pairings for Cryptographers", IACR Cryptology ePrint Archive Report 2006/165, (May 2006), 1-11.

Gorbunov, Sergey, et al., "Predicate Encryption for Circuits from LWE", Crypto, (2015), 30 pgs.

Hallingstad, Geir, et al., "Protected Core Networking: An Architectural Approach to Secure and Flexible Communications", IEEE Communications Magazine, (Nov. 2008), 35-41.

Hartog, T., et al., "Security Shift in Future Network Architectures", TNO Information and Communication Technology, Delft (Netherlands), (2010), 2-1/2-10.

Karlin, Josh, et al., "Decoy Routing: Toward Unblockable Internet Communication", Proceedings of the USENIX Workshop on Free and Open Communications on the Internet, San Francisco, CA, (Aug. 2011), 6 pgs.

Katz, J., "Predicate Encryption Supporting Disjunctions, Polynomial Equations, and Inner Products", Springer, Heidelberg EUROCRYPT LNCS, vol. 4965,, (2008), 29 pgs.

Koury, John, et al., "Efficient Private Publish-Subscribe Systems", 2014 IEEE 17th International Symposium on Distributed Computing (ISORC), (Jun. 2014), 9 pgs.

Khoury, Joud, et al., "An Efficient and Expressive Access Control Architecture for Content-based Networks", 2014 IEEE Military Communications Conference (MILCOM), (2014), 6 pgs.

Lewko, A., et al., "Decentralizing Attribute-Based Encryption", EUROCRYPT, (2011), 31 pgs.

Pal, P., "P3S: A Privacy-Preserving Publish-Subscribe Middleware", ACM/IFIP/USENIX Middleware 2012, Montreal Canada, (Dec. 2012), 20 pgs.

Partridge, Craig, et al., "A Secure Content Network in Space", CHANTS'12,Istanbul, Turkey., (Aug. 2012), 43-49.

Rouselakis, Yannis, et al., "Efficient Statically-Secure Large-Universe Multi-Authority Attribute-Based Encryption", Financial Cryptography, (2015), 20 pgs.

Sahai, A, et al., "Fuzzy identity-base encryption", 24th Annual International Conference on the Theory and Application of Cryptographic Techniques, Aarhus Denmark., (2005), 457-473.

Sandhu, Ravi, et al., "Lattice Based Access Control", Computer, IEEE,, (Nov. 1993), 9-19.

Strayer, Tim, et al., "An Architecture for Scalable Network Defense", Proceedings of the 34th IEEE Conference on Local Computer Networks (LCN 2009), Zurich, Switzerland., (Oct. 2009), 4 pgs.

Strayer, Tim, et al., "CASCADE: Communities for Military Ad Hoc Networks", Proceedings of MILCOM 2013, San Diego, CA, (Nov. 2013), 6 pgs.

Waters, Brent, "Ciphertext-Policy Attribute-Based Encryption: An Expressive, Efficient, and Provably Secure Realization", University of Texas at Austin, Unpublished Manuscript. Retrieved from the Internet: <URL: http://eprint.iacr.org/2008/290.pdf>, (Accessed May 30, 2012), 30 pgs.

* cited by examiner

US 9,894,043 B2

CRYPTOGRAPHICALLY SECURE CROSS-DOMAIN INFORMATION SHARING

CLAIM OF PRIORITY

This application claims the benefit of priority under 35 U.S.C. § 119(e) to U.S. Provisional Application No. 62/235,244, filed Sep. 30, 2015, entitled "CRYPTOGRAPHICALLY SECURE CROSS-DOMAIN INFORMATION SHARING," which is incorporated herein by reference in its entirety.

TECHNICAL FIELD

The present disclosure relates generally to encryption, and specifically to cryptographically secure cross-domain information sharing.

BACKGROUND

Secure and efficient mechanisms for timely sharing of information are critical for many commercial and military applications such as in enterprises, data centers, and emergency response operations. Networks that are immediately available and robust lay the groundwork for sharing critical information, but the other side of that coin is equally important: securely sharing information amongst potentially diverse groups. Without the right security protections and access controls in place, highly useful but sensitive information is difficult to share in a timely manner because of the risk of an information leak to inappropriate parties.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
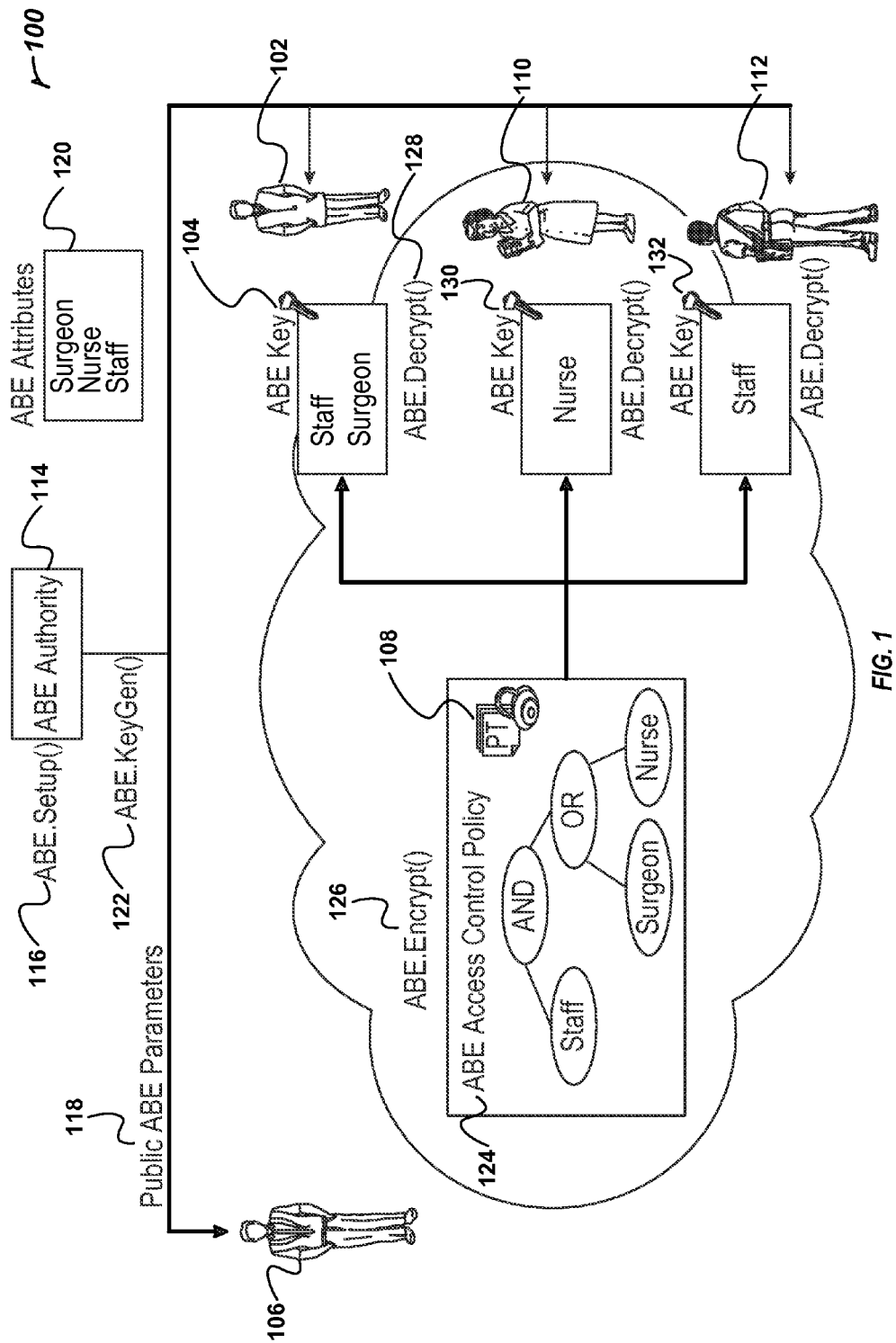
FIG. 1 is an illustration of an example Ciphertext-Policy Attribute-based Encryption system (CP-ABE) with a centralized trusted ABE authority, in accordance with some embodiments.

The present disclosure describes methods, systems, and computer program products that individually facilitate cryptographically secure, cross-domain information sharing.

Secure information sharing is reasonably straightforward in a homogenous environment where all participants have the same information security privileges. However, the real world is more complicated because information may belong to multiple security domains, which may be controlled by multiple independent authorities. Today, securely sharing information across different security domains (e.g., corresponding to different classification levels) may require highly-specialized personnel, multiple sets of encryption devices, guards, access control lists, network and systems solutions (e.g., VPNs, firewalls, subnets), and other complex mandatory access control ("MAC") solutions such as multi-level security ("MLS") mechanisms that may be difficult to configure, operate, and manage. In addition, the complexity of these solutions increases their vulnerability to faults and leakages and complicates providing actual security guarantees. Such management and security problems may manifest themselves even within a single administrative domain (e.g., within the administrative boundaries of an enterprise, such as a hospital with medical records). These problems may be further exacerbated when information is shared across multiple security domains and authorities (e.g., between two independent hospitals, or between a hospital and a health insurance company). Thus, what is needed is a solution to enable cryptographically secure and easy-to-operate multi-authority and cross-domain information sharing.

Attribute-based Encryption ("ABE") is a one-to-many encryption solution that permits data decryption by any recipient whose ABE private key attributes satisfy a specified ABE decryption policy, and does not permit data decryption by any recipient whose ABE private key attributes do not satisfy the specified ABE decryption policy. Encrypting data with ABE does not require prior knowledge of who the intended recipients are: the ABE data encryption process supports specifying an attribute-based access control policy as the ABE decryption policy. ABE technology provides expressive access control with cryptographic security guarantees and reduces the management burdens of configuring, operating, and maintaining information sharing architectures.

In order to realize the power of ABE in simplifying secure information sharing, however, several technical challenges should be addressed first. At a high level, these technical challenges include advancing ABE technologies to support both multiple domain authorities and cross-domain sharing, and enhancing the expressiveness and efficiency of the ABE technologies so that they are useful in practice.

In this disclosure, the term "security domain" refers to a set of users and systems who operate under a single administrative authority and who receive a defined level of security protection. Each authority may define multiple such security domains. Commercial examples of domains to which this technology applies include, but are not limited to, personal information networks (e.g., a home network, a personal area network, or a vehicular network), and enterprise networks (e.g., a company such as a corporation or a hospital). An authority may define multiple access control domains. As an example, the United States as an authority may define multiple classification domains, such as TOP SECRET, SECRET, CONFIDENTIAL, UNCLASSIFIED, etc. An authority may also define policies and mechanisms, by which information can cross between different security domains (e.g., for cross-domain information sharing). An authority may also agree to share information with another independent authority under terms agreed upon by both authorities. For example, the U.S.A. and the U.K., under the NATO coalition, may agree to define a NATO security domain (e.g., NATO/SECRET) and to share some agreed upon information between each other. Similarly, two (or more) enterprises may agree to share data. There is a need for securely sharing information across such domain and authority boundaries.

FIG. 1 is an illustration of an example Ciphertext-Policy Attribute-based Encryption ("CP-ABE") system 100 with a centralized trusted ABE authority 114, in accordance with some embodiments. CP-ABE is a variant of ABE. In CP-ABE, an ABE ciphertext comprises an encrypted message as well as an unencrypted ABE access control policy, which may be expressed as a Boolean formula f. A user's ABE private key is associated with a set of ABE attributes x attributed to the user. A user can decrypt a given ABE ciphertext and recover the unencrypted message within the ABE ciphertext if and only if the ABE attributes of the user's ABE private key satisfy formula f (e.g., f(x)=1).

The ABE authority 114 sets up the system (ABE.Setup( )) 116) to create the public ABE parameters 118 and the universe of ABE attributes 120. As illustrated in FIG. 1, the ABE authority 114, a hospital, creates the universe of ABE attributes {STAFF, SURGEON, NURSE} 120. The ABE authority 114 then creates and distributes (ABE.KeyGen( )) 122) a unique ABE private key to each user; a user's unique ABE private key is associated with a subset of ABE attributes specific to the user. As illustrated in FIG. 1, the doctor's 102 ABE private key 104 is associated with the ABE attributes {STAFF, SURGEON}.

A user may encrypt 126 plaintext (PT) data 108 using an ABE access control policy 124, which, in some embodiments, is an expressive Boolean formula over the universe of ABE attributes 120. As illustrated in FIG. 1, encrypting user 106 encrypts plaintext data 108 using the ABE access control policy 124 [STAFF AND (SURGEON OR NURSE)]. The encrypting user 106 does not need to have prior knowledge of who the intended recipients are, yet is able to enforce fine-grained access control on the plaintext data 108 by specifying the ABE access control policy 124 as a Boolean formula of ABE attributes that another user's ABE private key must satisfy to decrypt 128 the plaintext data 108. Only a user whose ABE private key is associated with the ABE attributes that satisfy the ABE access control policy 124 is able to decrypt 128 the plaintext data 108 successfully. For example, as illustrated in FIG. 1, the nurse 110, whose ABE private key 130 is associated with only the {NURSE} ABE attribute, cannot decrypt the plaintext data 108, nor can the staff member 112, whose ABE private key 132 is associated with only the {STAFF} ABE attribute.

A fundamental security property of an ABE system is "collusion resistance," which means that a group of users cannot combine their ABE private keys to decrypt an ABE ciphertext that none of the users in the group could individually decrypt. For example, as illustrated in FIG. 1, the nurse 110 and the staff member 112 cannot combine their ABE private keys 130, 132 (associated with the ABE attributes {NURSE} and {STAFF}, respectively) to create a "combined" ABE private key (associated with the ABE attributes {NURSE, STAFF}), which would allow the nurse 110 and the staff member 112 to jointly decrypt the plaintext data 108.

An ABE access control policy 124 may be expressive, and may support any monotone access structure, including formulas comprising the Boolean operators AND and OR (but not the Boolean operator NOT), and more general "threshold tree" expressions, where the tree "leaves" are the ABE attributes and the tree "nodes" are k-of-n threshold gates. As illustrated in FIG. 1, the example ABE access control policy 124 is a Boolean threshold tree with an AND (a 2-of-2 threshold gate) and an OR (a 1-of-2 threshold gate). In an embodiment, to support the Boolean operator NOT ("¬"), the original ABE attribute universe may be doubled to include the ABE attributes in the original ABE attribute universe and a new, negated version of each ABE attribute in the original ABE attribute universe; in other words, the new ABE attribute universe is designed to include each original ABE attribute and the negative of each original ABE attribute. For example, the example ABE attribute universe 120 in FIG. 1 can be expanded to include each original ABE attribute (e.g., {STAFF, SURGEON, NURSE}) and the negation (¬) of each original ABE attribute (e.g., {¬ STAFF, ¬ SURGEON, ¬ NURSE}) to create the new ABE attribute universe {STAFF, ¬ STAFF, SURGEON, ¬ SURGEON, NURSE, ¬ NURSE}.

To reduce the maintenance burden in ABE systems with a large universe of ABE attributes, an ABE authority 114 does not have to enumerate all possible ABE attribute combinations during system setup 116. Instead, any string may be used as an ABE attribute and the ABE attribute universe 120 may be arbitrarily large.

Another variant of ABE is Key-Policy ABE (KP-ABE), where the ciphertext is associated with ABE attributes while the user's ABE private key is associated with the ABE access control policy 124 (e.g., a Boolean formula f). CP-ABE and KP-ABE are duals, and the choice to use one or the other generally depends on the use case (specifically, whether the ABE access control policy 124 is enforced by the trusted authority or by the data publisher). Although, for purposes of clarity, this disclosure discusses CP-ABE, the embodiments are compatible with either CP-ABE or KP-ABE.

Figure 2:
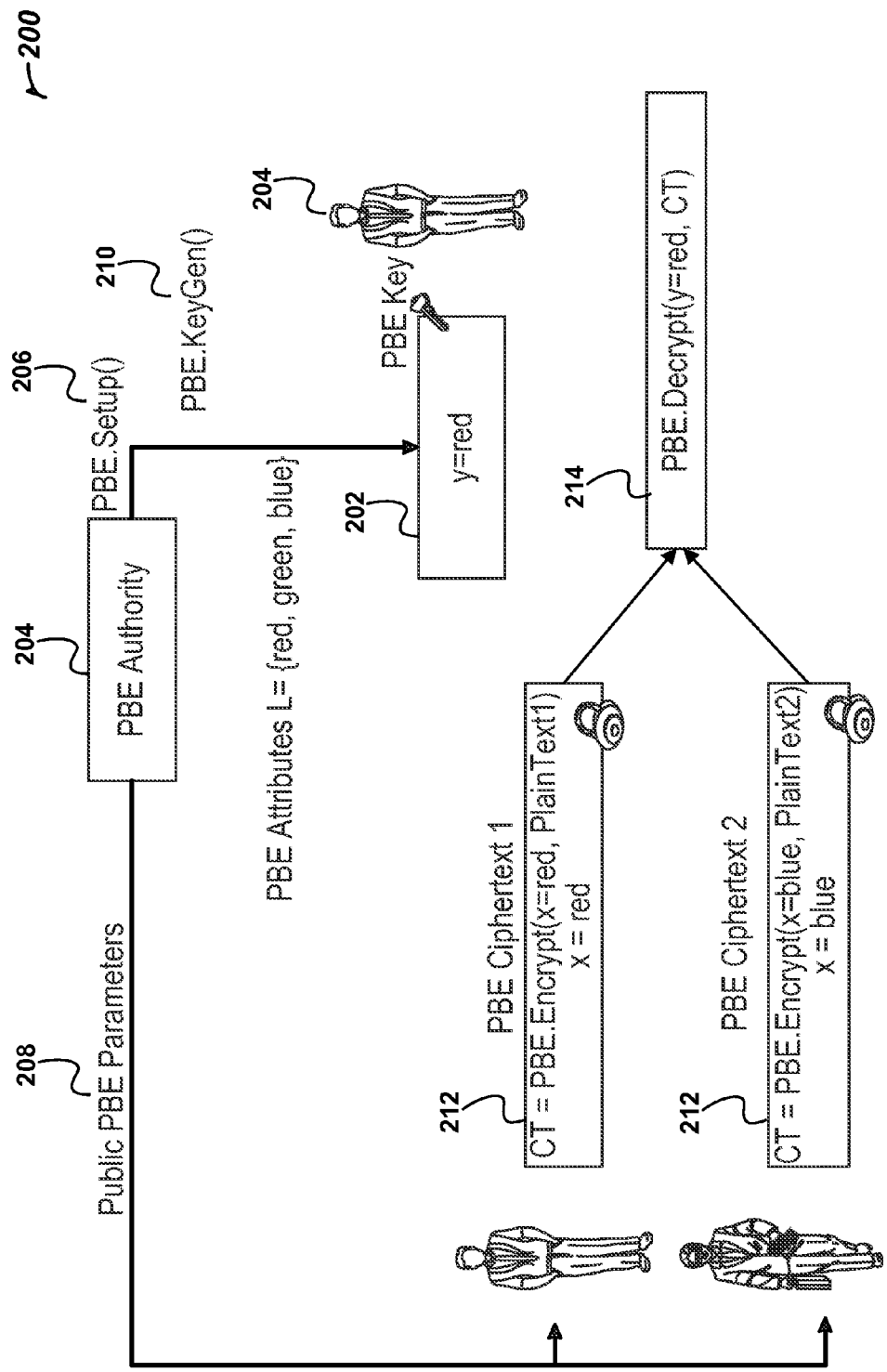
FIG. 2 is an illustration of an example Predicate-based Encryption (PBE) system with a centralized trusted PBE authority, in accordance with some embodiments.

FIG. 2 is an illustration of an example Predicate-based Encryption (PBE) system 200 with a centralized trusted PBE authority 204, in accordance with some embodiments. PBE is an evolution of ABE that provides an additional important security property: "attribute hiding," which means that PBE ciphertext does not "leak" any information about the PBE attributes with which it was encrypted, even after the PBE ciphertext has been successfully decrypted.

With PBE, a piece of plaintext data is encrypted with a PBE attribute vector x of width l (e.g., comprising l PBE attributes) to create the PBE ciphertext. A user is assigned a PBE private key corresponding to some PBE attribute vector y, which is also of width l. The user is able to decrypt the PBE ciphertext if and only if f(x, y)=1. With attribute hiding, PBE guarantees that the PBE ciphertext does not reveal any information about the PBE attribute vector x, with which the PBE ciphertext was encrypted, even after the PBE ciphertext is successfully decrypted.

An example of a simple PBE system is one with a PBE attribute vector x of width l=1, that is, x=<x> and y=<y> where PBE attribute x∈L, y∈L∪{*}, L is the set of PBE attributes, and * is the "wildcard" attribute (which is satisfied by any attribute z∈L). Let predicate f be the exact match predicate, that is, f(x,y)=1 if x=y or y=*.

FIG. 2 shows an example of a PBE system 200 where PBE attribute vector x is chosen from the set L={red, green, blue}. The centralized PBE authority 204 sets up 206 the system 200 with the desired public PBE parameters 206. The PBE authority 204 then generates and assigns 210 a unique PBE private key to each user; a user's PBE private key corresponds to the user's PBE attributes. For example, as illustrated FIG. 2, the PBE private key y=red 202 is assigned to user 204. Any message M may be encrypted 212 with a PBE attribute x∈L.

As illustrated in FIG. 2, PBE ciphertext 1 is created by encrypting plaintext1 with x=red, and PBE ciphertext 2 is created by encrypting plaintext2 with x=blue. A PBE ciphertext reveals nothing about the PBE attribute x that was used to create the PBE ciphertext—that is, a user (including an eavesdropper) may not distinguish which PBE ciphertext is encrypted with which PBE attribute(s). A user decrypts 214 a PBE ciphertext using the user's PBE private key. For example, as illustrated in FIG. 2, user 204 with PBE private key y=red 202 can only decrypt PBE ciphertext 1 created with PBE attribute x=red, and cannot learn anything about the PBE attribute vector x beyond what the output of PBE predicate f reveals (e.g., match or no match). Similar to ABE systems, PBE systems are "collusion-resistant," meaning that any two users cannot combine their PBE private keys to decrypt a PBE ciphertext that neither of their PBE private keys is individually able to decrypt.

The simple exact match predicate f enables more expressive policies to be layered on top of it. These include conjunctive equality policies (e.g., $x_1$=a AND $x_2$=b), subset policies (e.g., x∈{a, b}), and range policies (e.g., a≤x≤b). In some PBE implementations, the predicate f may be even more expressive; for example, the predicate f may support inner product predicates (e.g., f(x, y)=1 if $\Sigma_i x_i y_i$=0, which can simulate polynomials of a certain bounded degree (depending on width l). PBE systems are not, however, as expressive as ABE systems.

Current ABE systems provide cryptographically secure access control, but fall short of meeting current and future operational information sharing needs, such as real-world information sharing scenarios involving networked entities that may span multiple enterprises or countries. Even within a single enterprise, information may be segregated into different security domains, each of which may require different security protections. Projecting ABE onto such multi-domain and multi-authority operational settings may come with several technical challenges. A first challenge is supporting information sharing across independent authorities (such as between partner corporations, or between the U.S.A. and a partner nation) without requiring a centralized trusted authority. A second challenge is supporting cross-domain protections to enable multi-level information sharing over the same underlying infrastructure. Finally, tradeoffs between expressiveness and performance as well as simplicity of setup and configuration may be required.

Single Domain, Single Authority Solutions

Consider a single security domain named "SECRET" for example, which is managed by a single authority. Several different parties access this SECRET network. In today's model, the network is segregated so that each party has access only to what that party needs to know. Providing such segregation and access control to the different parties may require complex solutions that may be costly to establish and maintain (e.g., firewalls, virtual private networks, access control lists, subnets, etc.)

An access control solution based on ABE is easier to establish and maintain, and allows cryptographic segregation of information over a shared network infrastructure. As shown in FIG. 1, the ABE authority 114 managing the security domain assigns ABE private keys 104, 130, 132 to the different users 102, 110, 112 and devices based on their respective ABE attributes. The ABE system 100 provides cryptographic guarantees that users or devices can only access the information for which they are authorized, without requiring more complex access control mechanisms. The ABE system 100 illustrated in FIG. 1 additionally allows the system 100 to be decentralized and enables secure offline operations.

Single Domain, Multi-Authority Solutions

In the ABE system 100 illustrated in FIG. 1, the centralized ABE authority 114 controls the ABE attribute universe, issues all ABE private keys, and is trusted by all ABE participants. Although this centralized model is sufficient in certain scenarios, there are many practical situations where it may be undesirable to have a single trusted ABE authority 114, particularly because an ABE system with a single trusted ABE authority 114 suffers from the "key escrow problem," where the single trusted ABE authority 114 has plaintext access to all encrypted data. Users might want to share information across potentially autonomous domains, each of which may have its own ABE attribute universe and corresponding ABE key space. For example, under the NATO coalition, the U.S.A. and the U.K. might need to share information securely while remaining independent authorities and without having to mutually trust some external authority or third party to enable the information sharing.

Figure 3:
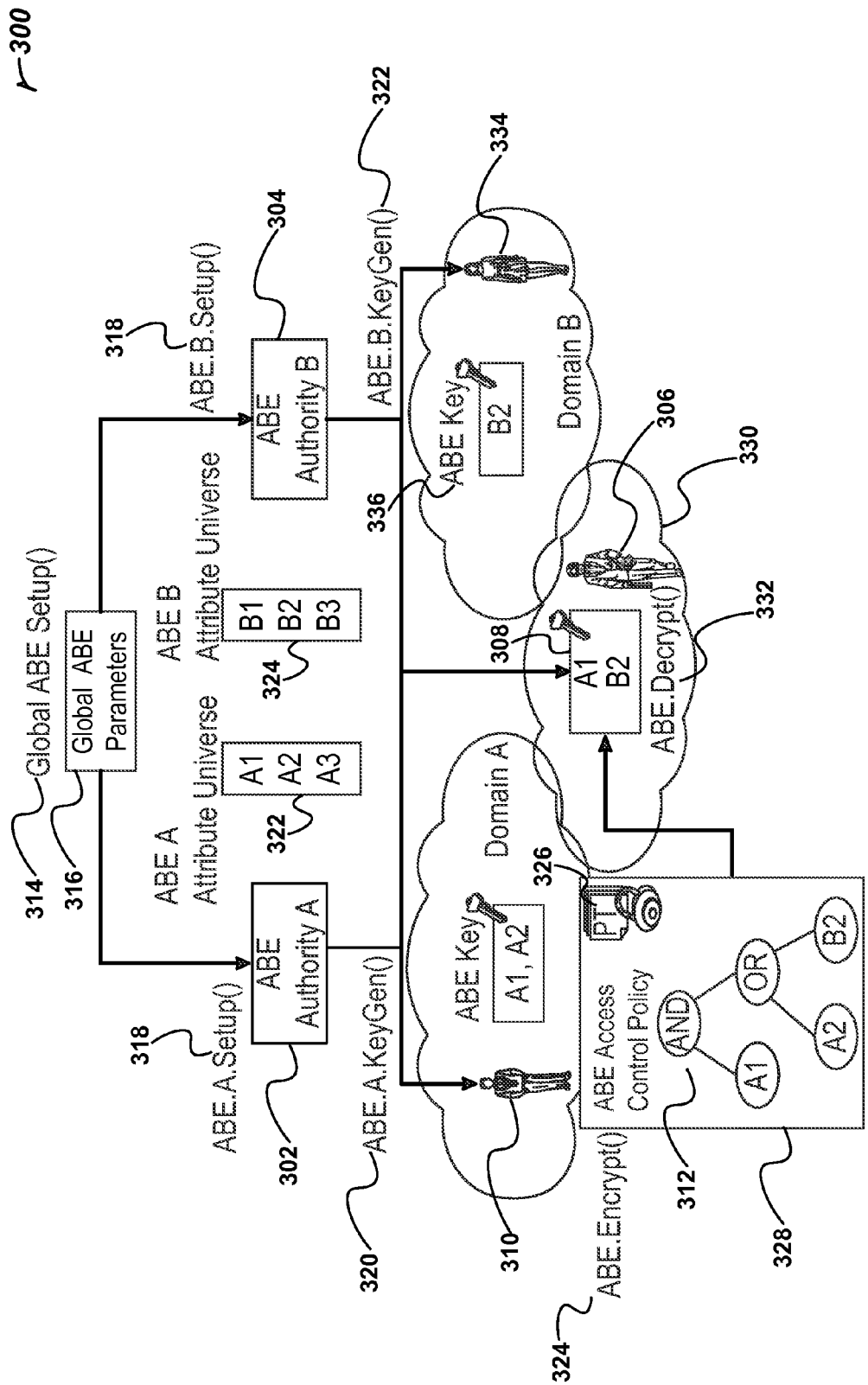
FIG. 3 is an illustration of an example decentralized CP-ABE system that spans multiple independent ABE authorities, in accordance with some embodiments.

FIG. 3 is an illustration of an example decentralized CP-ABE system 300 that spans multiple independent ABE authorities, in accordance with some embodiments. ABE Authority A 302 and ABE Authority B 304 are independent ABE authorities that may, for example, correspond to independent military units that come together to work on a joint military mission (e.g., a U.S.A. military unit and a U.K. military unit). The independent ABE authorities 302, 304 are able to issue mission-specific ABE attributes and ABE keys to their users (e.g., soldiers) and devices (e.g., smartphones, military radios, etc.) for information sharing in relation to the military mission while retaining their individual autonomy and without requiring any central trusted authority. The military units do not have to be aware of each other before the military mission; they simply agree on global parameters for interoperability.

As illustrated in FIG. 3, ABE Authority A 302 and ABE Authority B 304 agree on the security domains (e.g., A/SECRET and B/SECRET) and the domain protections. A global ABE setup 314 initializes the global ABE parameters 316. Each ABE authority 302, 304 may then autonomously set up 318 its own ABE system for its respective subset of the ABE attribute space. Each ABE authority 302, 304 generates and issues 320 to each user a unique ABE private key corresponding to the user's set of ABE attributes. For example, as illustrated in FIG. 3, each ABE private key issued by ABE Authority A 302 corresponds to an ABE attribute set from ABE A attribute universe 322 (e.g., —{A1, A2, A3}) and each ABE private key issued by ABE Authority B 304 corresponds to an ABE attribute set from ABE attribute universe 324 (e.g., {B1, B2, B3}).

In addition, a user may compose their own composite ABE private key using ABE attributes assigned to the user from the different ABE authorities. For example, as illustrated in FIG. 3, ABE authority A 302 generates and assigns 320 to user 306 an ABE private key corresponding to attribute A1 and ABE authority B 304 generates and assigns 322 to user 306 an ABE private key corresponding to attribute B2; user 306 then creates composite ABE private key 308, whose ABE attributes are {A1, B2}. Similarly, a user may encrypt with an ABE access control policy specified by ABE attributes from multiple ABE authorities, including ABE attributes that the encrypting user does not possess. For example, as illustrated in FIG. 3, user 310 encrypts 324 a plaintext 326 using ABE access control policy 312, whose Boolean formula is [A1 AND (A2 OR B2)], to produce ABE ciphertext 328. In access control policy 312, ABE attributes A1 and A2 are from ABE Authority A 302 while ABE attribute B2 is from ABE Authority B 304. User 306 is able to successfully decrypt 332 ABE ciphertext 328 because user's 306 ABE private key 308 satisfies the ABE access control policy 312. Similarly, user 334 is unable to successfully decrypt ABE ciphertext 328 because user's 334 ABE private key 336 does NOT satisfy the ABE access control policy 312. This secure and fine-grained access control capability is powerful for information sharing between independent ABE authorities because it eliminates the need for a central trusted ABE authority.

Cross-Domain Solutions (Single and Multi-Authority)

An ABE authority may define multiple security domains, each requiring different protections. For example, an ABE authority may define a set of security domains corresponding to classifications, such as a TOP SECRET domain, a SECRET domain, etc. The ABE authority may then define the rules and mechanisms for sharing information across the different security domains; these rules and mechanisms are referred to as "cross-domain solutions". A security domain may span multiple independent ABE authorities, for example as illustrated in FIG. 3 by composite security domain 330.

In many current systems, different domains are strictly segregated and a boundary controller tightly controls any cross-domain information flows. Even in this compartmentalized model, ABE can significantly simplify the cross-domain solution. Consider an ABE system where one ABE authority configures two security domains, and assigns respective ABE attributes/keys to users and devices within each respective security domain. This ABE solution helps ensure that information may flow from one security domain to another only if all of the elements along the path have the correct ABE keys/attributes. In some embodiments, this ABE system allows only authorized ABE users or devices to access information, and mitigates cross-domain security violations, although the scope of the embodiments is not limited in this respect.

A more interesting ABE model is one in which security domain segregation may be relaxed, and information with mixed security classifications may be securely controlled and shared over the same infrastructure. Enabling such cross-domain information sharing efficiently within the same system (using the same underlying infrastructure) is a difficult problem, from both a technical and a policy perspective.

The ABE systems described above may help enable fine-grained access control within a single security domain that may span multiple ABE authorities (e.g., FIG. 3), however, they do not allow information with different security levels (e.g., classifications) to be shared within the same system over the same infrastructure. To see why, assume an ABE solution A' shares information at different security levels over the same infrastructure. Assume all information within A' is protected with an additional "classification" attribute: users with the SECRET attribute can access information encrypted with SECRET in the policy, for example. A major issue with the A' approach is that the A' ciphertext includes the encryption policy (in the case of CP-ABE) or attributes (in the case of KP-ABE) "in the clear" (i.e., unencrypted); this leaks sensitive information, namely the classification level that was used to encrypt the information, and exposes A' to targeted attacks, rendering ABE unsuitable for some information security solutions.

Figure 4:
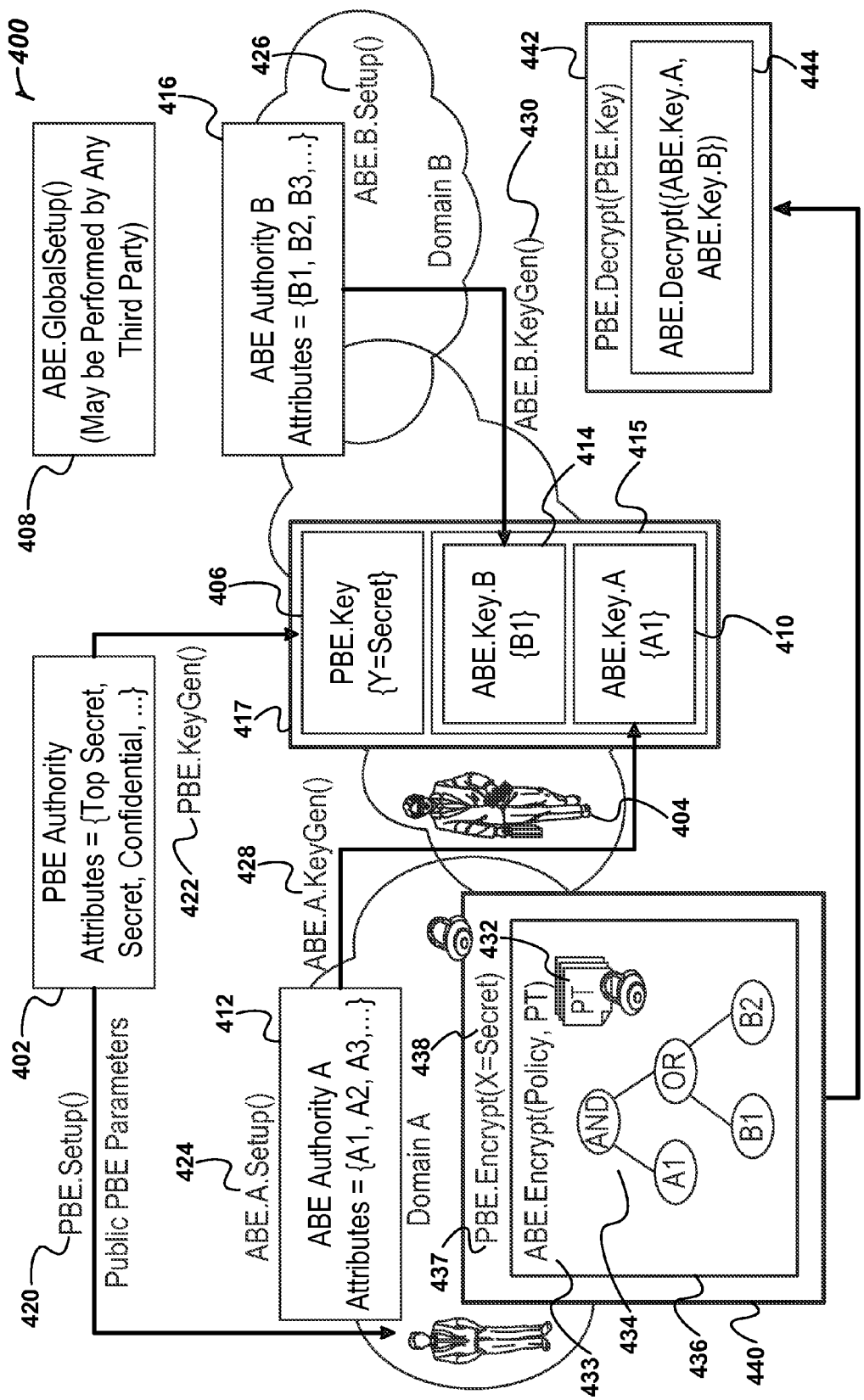
FIG. 4 is an illustration of an example secure cross-domain information sharing system combining single authority PBE with multi-authority ABE, in accordance with some embodiments.

FIG. 4 is an illustration of an example secure cross-domain information sharing system combining single authority PBE with multi-authority ABE, in accordance with some embodiments. PBE acts as the outer envelope of a message, completely hiding the classification level of the encrypted data within the message, while ABE is used for highly expressive and decentralized access control to the message, resulting in a system that supports cryptographically secure cross-domain information sharing.

In FIG. 4, a centralized PBE authority 402 initializes 420 classifications and the associated keying material. The centralized PBE authority 402 is initialized with the universe of PBE attributes {TOP SECRET, SECRET, CONFIDENTIAL, UNCLASSIFIED} corresponding to the desired clearance/classification levels. The centralized PBE authority 402 generates and assigns 422 to each user a PBE private key corresponding to the user's clearance/classification level. For example, as illustrated in FIG. 4, user 404 obtains a PBE private key 406 corresponding to PBE attribute y=SECRET (the SECRET classification/clearance level).

A decentralized multi-authority ABE system 408 is initialized as illustrated in FIG. 3 and described in the corresponding paragraphs. A global setup allows multiple autonomous ABE authorities 412, 416 to each set up 424, 426 its own ABE system corresponding to the respective ABE attribute universe controlled by the respective ABE authority 412, 416. The ABE authorities 412, 416 may be the same ABE authority, or may be distinct ABE authorities. In addition to the assigned 422 PBE private key, each user is assigned an ABE private key from one or more ABE authorities based on that user's ABE attributes. For example, as illustrated in FIG. 4, ABE authority A 412 generates and assigns 428 to user 404 ABE private key A 410 corresponding to ABE attribute A1, and ABE authority B 416 generates and assigns 430 to user 404 ABE private key B 414 corresponding to ABE attribute B1. User 404 then combines ABE private key A 410 and ABE private key B 414 to form composite ABE private key 415. User 404 then combines composite ABE private key 415 with PBE private key 406 to form the user's "master" private key 417, which now comprises three pieces: a PBE private key 406 and two ABE private keys 410, 414, one from each ABE authority 412, 416.

Plaintext (PT) data 432 is protected by first encrypting 433 the plaintext data 432 using an expressive ABE access control policy 434. The resulting ABE ciphertext 436 is then encrypted 437 with the PBE attribute (classification) 438 to form the PBE ciphertext 440; this encryption step 437 may be performed by the encrypting user or by some other trusted entity in the system. A user that receives the PBE ciphertext 440 first attempts to PBE decrypt 442 the PBE ciphertext 440 using the user's PBE private key. If successful, the PBE decryption 442 produces the ABE ciphertext 436. The user then attempts to ABE decrypt 444 the ABE ciphertext 436 with the user's composite ABE private key 415; if the ABE decryption 444 is successful, the user recovers the plaintext data 432.

A user attempting PBE decryption 442 learns the result of the PBE decryption 442 (e.g., success or failure) but learns nothing else about the PBE attribute x (classification) 438, with which the ABE ciphertext 436 was PBE encrypted 442 to create PBE ciphertext 440; this attribute-hiding property permits securely sharing PBE ciphertexts 440 of different classifications within the same system without leaking the classification 438. Using PBE together with the expressiveness of an ABE access control policy 434 and multiple ABE authorities enables secure and expressive cross-domain information sharing.

Although FIG. 4 illustrates a single PBE authority 402, in some embodiments, multiple PBE authorities 402 may be used. In such embodiments, a user may form a composite PBE private key in a similar fashion to the procedure for forming a composite ABE private key 410, as illustrated in FIG. 4.

Note that in FIG. 4, all PBE ciphertexts 440 are assumed to be encrypted using the same security parameter, which may correspond to the highest classification level 438 (e.g., 256 bits of security for TOP-SECRET in accordance with NSA Suite B recommendations) or the lowest classification level, depending on the required protections. Alternatively, ABE ciphertexts 436 may be encrypted using a security parameter that is either selected by the encrypting user or dictated by an organizational policy.

PBE Expressiveness and Performance

FIG. 4 illustrates how a simple PBE policy can be implemented: data is PBE encrypted with a single PBE attribute (the clearance/classification level), and a user is able to decrypt the PBE ciphertext if and only if either the user's PBE private key corresponds to the attribute (which itself corresponds to the classification level) with which the ciphertext is encrypted, or corresponds to the wildcard attribute (e.g., *).

A PBE system with the exact match predicate and with PBE attribute vector x of fixed width l is referred to as a Hidden Vector Encryption (HVE) system. In an HVE system, a message is encrypted with PBE attribute vector $x=\langle x_1, x_2, \ldots x_l \rangle$, $x_i \in L$, and a PBE private key is associated with PBE attribute vector $y=\langle y_1, y_2, \ldots y_l \rangle$, $y_i \in L \cup \{*\}$, where L is the PBE alphabet (set of PBE attributes) and * is the wildcard attribute. The exact match predicate ensures that a PBE ciphertext encrypted with PBE vector x may be decrypted with PBE vector y if and only if for all i in [1, l], $x_i = y_i$ or $y_i = *$.

In addition to supporting equality matching, this HVE system enables more expressive conjunctive comparison, subset, and range policies than a simple PBE system, although less efficiently. Let $T=\{1, 2, \ldots n\}$ be a finite set of size n. The conjunctive comparison predicate is defined as $g(x, y)=1$ if and only if for all i in [1, l], $x_i \geq y_i$ where $x_i, y_i \in T$. Similarly, the subset predicate is defined as $h(x, y)=1$ if and only if for all i in [1, l], $x_i \in y_i$ where $x_i \in T$, and $y_i \subseteq T$; that is, each element $y_i$ is a subset of the set T. Both the conjunctive comparison predicate g and the subset predicate h may be directly realized from the HVE predicate f at a cost of O(n) factor reduction in efficiency.

As an illustrative example, strictly hierarchical multi-level policies using the subset predicate h may be implemented as follows. Assume a PBE system has four classification levels (e.g., T={TOP SECRET, SECRET, CONFIDENTIAL, UNCLASSIFIED}). Also, assume that a user (or a device) that is cleared to TOP SECRET should be allowed to access information at any classification level, a user that is cleared to SECRET to access only SECRET, CONFIDENTIAL, or UNCLASSIFIED information, and a user that is cleared to CONFIDENTIAL is allowed to access only CONFIDENTIAL or UNCLASSIFIED information. A PBE system may be constructed with PBE attribute vector x of width l=1 (i.e., $x=\langle x \rangle$ and $y=\langle y \rangle$), and PBE private keys may be generated and assigned to users based on their clearances as follows: a user with TOP SECRET clearance is assigned a PBE private key corresponding to the subset y={TOP SECRET, SECRET, CONFIDENTIAL}; a user with SECRET clearance is assigned a PBE private key corresponding to the subset y={SECRET, CONFIDENTIAL}; and a user with CONFIDENTIAL clearance is assigned a PBE private key corresponding to the singleton set y={CONFIDENTIAL}. A message encrypted with PBE attribute x∈{TOP SECRET, SECRET, CONFIDENTIAL} may be decrypted by a PBE private key y if and only if x∈y, (e.g., h(x, y)=1), thus establishing the hierarchical policies.

The most expressive PBE systems constructed to date are those that support inner product predicates. The inner product predicate is defined as $p(x, y)=1$ if and only if $\Sigma_i x_i y_i = 0$. The inner product predicate can simulate polynomials of a certain bounded degree, including constrained Boolean expressions, but is less efficient than other PBE systems. Inner product predicates, for example, enable more expressive conjunctive and disjunctive exact match policies, such as $x_1 = a$ AND ($x_2 = b$ OR $x_3 = c$) where a, b, and c are PBE attributes, which may be arbitrary strings.

The performance of a fixed width HVE system may be measured in terms of encryption and decryption times and ciphertext expansion. In the fixed width HVE system described above, performance scales linearly with the HVE width l because every ciphertext is encrypted with l attributes. As l increases to support more complex policies, the system performance degrades linearly. For example, if each of the l positions in the HVE system corresponds to a feature (e.g., name, age, rank, clearance, etc.), then the HVE system can only support a fixed set of features before performance becomes impractical. For instance, it takes ~16 ms to decrypt an HVE ciphertext of width l=11, assuming a highly optimized implementation running on a MacBook core i7 processor with 128-bit security. On a mobile device, such as an Android smartphone, this operation is expected to be at least an order of magnitude slower due to the slower processor (among other variables). Hence, in CPU-bounded systems, as l increases, PBE may become a performance bottleneck.

The main reason for the inefficiency is the fixed width requirement. If a piece of data can be PBE encrypted with only the PBE attributes relevant to that data (instead of the whole PBE attribute vector), the resulting variable width HVE system will be more efficient. For example, a user may PBE encrypt with only the user's name and the user's rank (instead of having to assign all the l positions of the user's PBE private key).

Figure 5:
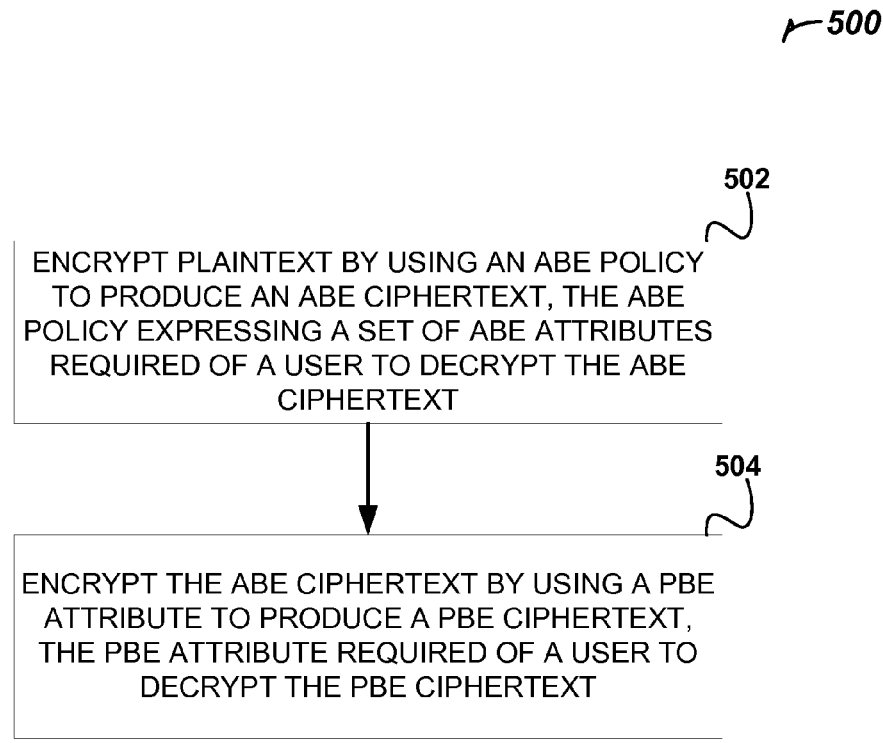
FIG. 5 is a flowchart illustrating operations of encrypting data using an example secure cross-domain information sharing system combining single authority PBE with multi-authority ABE, in accordance with some embodiments.

FIG. 5 is a flowchart illustrating operations of encrypting data using an example secure cross-domain information sharing system combining single authority PBE with multi-authority ABE, in accordance with some embodiments.

Plaintext data is encrypted by using an expressive ABE access control policy that specifies which ABE attribute(s), with which a decrypting user's ABE private key must be associated, to successfully decrypt the ABE ciphertext that results from the ABE encryption of the plaintext data (operation 502). The ABE encryption may be performed as illustrated in by reference numeral 433 of FIG. 4 and described in the corresponding paragraphs.

Next, the ABE ciphertext is encrypted by using a set of PBE attributes that specifies the PBE attribute(s), with which a decrypting user's PBE private key must be associated to successfully decrypt the PBE ciphertext that results from the PBE encryption of the ABE ciphertext (operation 504). The PBE encryption may be performed as illustrated by reference numeral 437 of FIG. 4 and described in the corresponding paragraphs.

Figure 6:
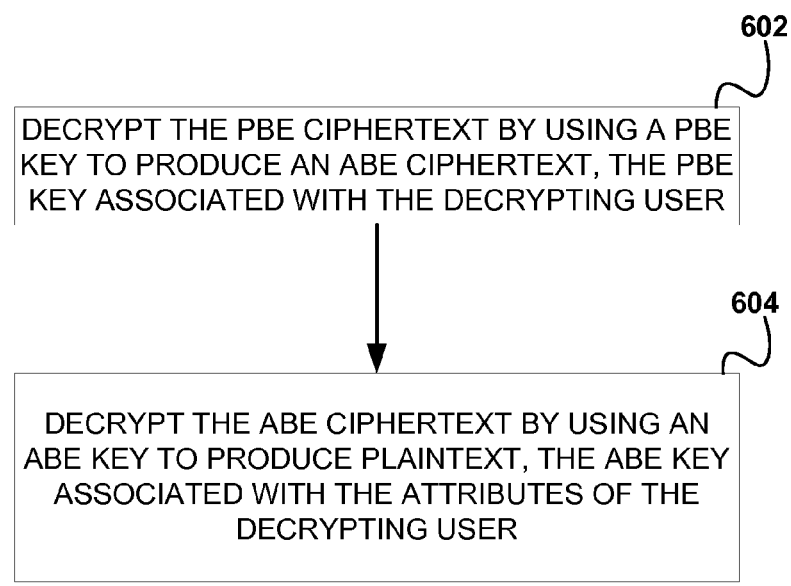
FIG. 6 is a flowchart illustrating operations of decrypting data using an example secure cross-domain information sharing system combining single authority PBE with multi-authority ABE, in accordance with some embodiments.

FIG. 6 is a flowchart illustrating operations of decrypting data using an example secure cross-domain information sharing system combining single authority PBE with multi-authority ABE, in accordance with some embodiments.

An attempt to decrypt the PBE ciphertext is performed by using a PBE private key associated with a set of PBE attributes of the user attempting PBE decryption (operation 602). The PBE private key may be a composite PBE private key composed of PBE attributes assigned to the decrypting user by more than one PBE authority. The PBE decryption may be performed as illustrated by reference numeral 442 of FIG. 4 and described in the corresponding paragraphs. The PBE decryption attempt will succeed if and only if the PBE private key of the user attempting decryption is associated with a set of PBE attributes that are compatible with (e.g., are equal to) the PBE attribute(s) used to encrypt the contents of the PBE ciphertext. If PBE decryption of the PBE ciphertext succeeds, the contents of the decrypted PBE ciphertext is an ABE ciphertext.

An attempt to decrypt the ABE ciphertext is performed by using an ABE private key associated with a set of ABE attributes of the user attempting ABE decryption (operation 604). The ABE private key may be a composite ABE private key composed of ABE attributes assigned to the decrypting user by more than one ABE authority. The ABE decryption may be performed as illustrated reference numeral 444 of FIG. 4 and described in the corresponding paragraphs. The ABE decryption attempt will succeed if and only if the ABE private key of the user attempting ABE decryption is associated with the ABE attribute(s) that satisfy the ABE access control policy used to encrypt the content of the ABE ciphertext. If ABE decryption of the ABE ciphertext succeeds, the contents of the decrypted ABE ciphertext is the plaintext data.

Figure 7:
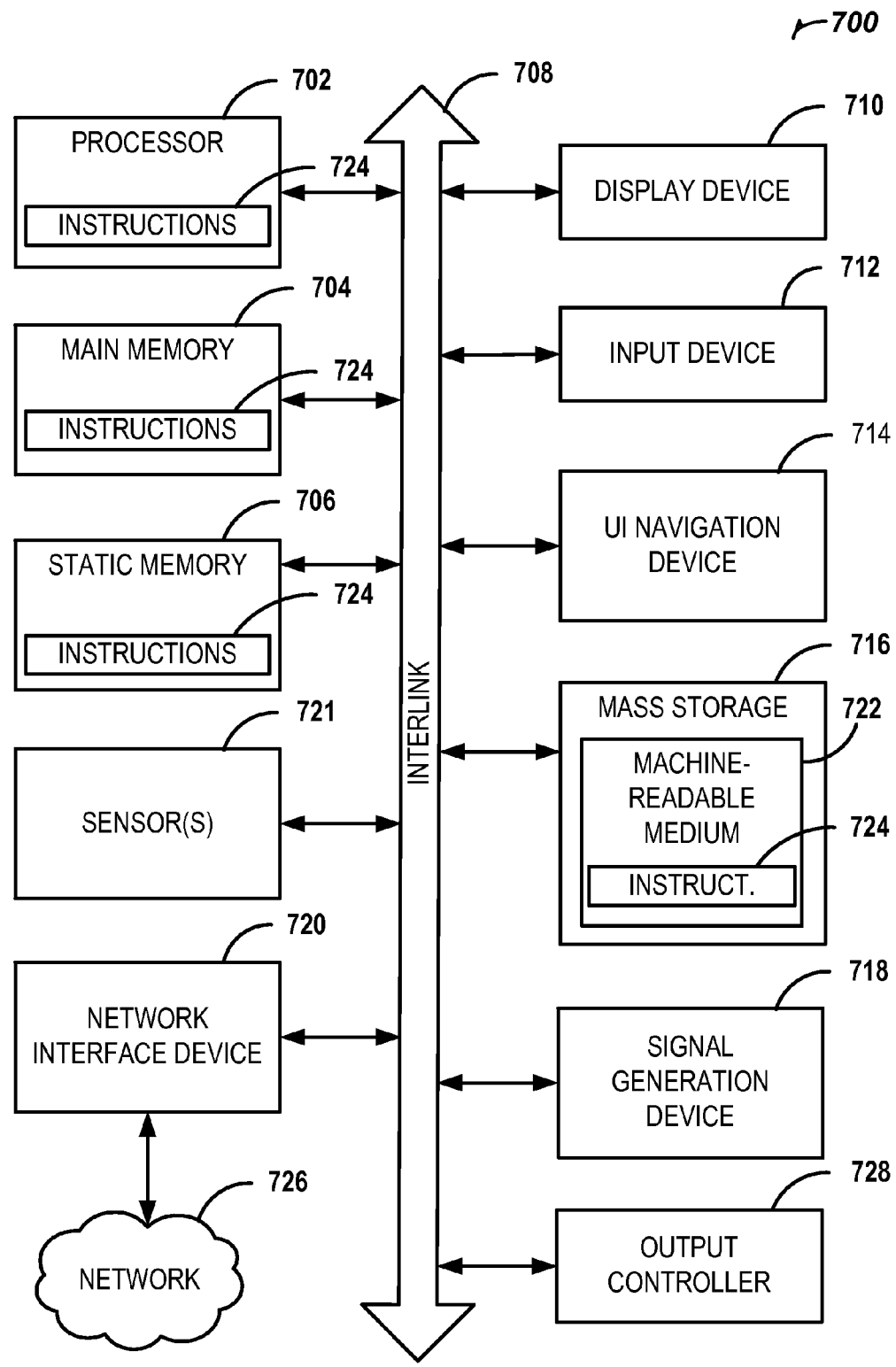
FIG. 7 is a block diagram illustrating an example of a machine, upon which any one or more example embodiments may be implemented.

FIG. 7 is a block diagram illustrating an example of a machine 700, upon which any one or more example embodiments may be implemented. In alternative embodiments, the machine 700 may operate as a standalone device or may be connected (e.g., networked) to other machines. In a networked deployment, the machine 700 may operate in the capacity of a server machine, a client machine, or both in a client-server network environment. In an example, the machine 700 may act as a peer machine in a peer-to-peer (P2P) (or other distributed) network environment. The machine 700 may implement or include any portion of the cryptographic systems or methods illustrated in FIGS. 1-6, and may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine-readable media.

Although the machine-readable medium 722 is illustrated as a single medium, the term "machine-readable medium" may include a single medium or multiple media (e.g., a centralized or distributed database, and/or associated caches and servers) configured to store the one or more instructions 724.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 700, and includes digital or analog communications signals or other intangible medium to facilitate communication of such software.

Additional Notes & Example Embodiments

Example 1 is a system for cryptographically secure cross-domain information sharing, the system comprising: a first information domain including a first attribute-based encryption (ABE) authority, the first ABE authority arranged to define a first universe of ABE attributes; and an encryption node arranged to: perform ABE encryption on plaintext to produce ABE ciphertext, the ABE encryption to use an ABE access control expression defined with a set of ABE attributes comprising a first ABE attribute subset from the first universe of ABE attributes and second ABE attribute subset from a second universe of ABE attributes, the second universe of ABE attributes defined by a second ABE authority of a second information domain; combine the ABE ciphertext with the ABE access control expression to produce an ABE package; and perform predicate-based encryption (PBE) on the ABE package to produce a PBE ciphertext, the PBE encryption to use a first set of PBE attributes from a universe of PBE attributes defined by a PBE authority.

In Example 2, the subject matter of Example 1 optionally includes, further comprising: a decryption node assigned: a first cryptographic key from the first ABE authority, the first cryptographic key corresponding to a third ABE attribute subset assigned to the decryption node by the first ABE authority; a second cryptographic key from the second ABE authority, the second cryptographic key corresponding to a fourth ABE attribute subset assigned to the decryption node by the second ABE authority; and a PBE key from the PBE authority, the PBE key corresponding to a second set of PBE attributes assigned to the decryption node by the PBE authority; and wherein the decryption node is arranged to: successfully decrypt, with the PBE key, the PBE ciphertext to produce the ABE package if and only if the second set of PBE attributes corresponds to the first set of PBE attributes; separate the ABE package into the ABE ciphertext and the ABE access control expression; and successfully decrypt, with the first cryptographic key and the second cryptographic key, the ABE ciphertext to produce the plaintext if and only if the third ABE attribute subset and the fourth ABE attribute subset satisfy the ABE access control expression.

In Example 3, the subject matter of Example 2 optionally includes, wherein the ABE access control expression is a Boolean expression with Boolean operators over the set of ABE attributes.

In Example 4, the subject matter of Example 3 optionally includes, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

In Example 5, the subject matter of any one or more of Examples 2-4 optionally include, wherein the second set of PBE attributes corresponds to the first set of PBE attributes when the second set of PBE attributes is identical to the first set of PBE attributes.

In Example 6, the subject matter of any one or more of Examples 1-5 optionally include, wherein the universe of PBE attributes corresponds to a hierarchy of security clearance levels.

In Example 7, the subject matter of any one or more of Examples 1-6 optionally include, wherein each ABE authority is a respective military unit comprising a respective set of nodes, and wherein each node in the respective set of nodes corresponds to a respective computing device for use by a respective soldier within the respective military unit.

In Example 8, the subject matter of any one or more of Examples 5-7 optionally include, wherein the first set of PBE attributes comprises: a first subset of PBE attributes from the first universe of PBE attributes defined by the first PBE authority; and a second subset of PBE attributes from a second universe of PBE attributes defined by a second PBE authority; and wherein the second set of PBE attributes comprises: a third subset of PBE attributes from the first universe of PBE attributes defined by the first PBE authority; and a fourth subset of PBE attributes from the second universe of PBE attributes defined by the second PBE authority.

Example 9 is a non-transitory, machine-readable medium comprising instructions which, when executed by a machine, cause the machine to be arranged to: encrypt, with ABE (attribute-based encryption), plaintext to produce ABE ciphertext, the ABE encryption to use an ABE access control expression defined with a set of ABE attributes comprising: a first ABE attribute subset from a first universe of ABE attributes defined by a first ABE authority of a first information domain; and a second ABE attribute subset from a second universe of ABE attributes, the second universe of ABE attributes defined by a second ABE authority of a second information domain; combine the ABE ciphertext with the ABE access control expression to produce an ABE package; and encrypt, with PBE (predicate-based encryption), the ABE package to produce a PBE ciphertext, the PBE encryption to use a first set of PBE attributes from a universe of PBE attributes defined by a PBE authority.

In Example 10, the subject matter of Example 9 optionally includes, wherein a decryption node is assigned: a first cryptographic key from the first ABE authority, the first cryptographic key corresponding to a third ABE attribute subset assigned to the decryption node by the first ABE authority; a second cryptographic key from the second ABE authority, the second cryptographic key corresponding to a fourth ABE attribute subset assigned to the decryption node by the second ABE authority; and a PBE key from the PBE authority, the PBE key corresponding to a second set of PBE attributes assigned to the decryption node by the PBE authority; and wherein the non-transitory, machine-readable medium comprises further instructions which, when executed by the decryption node, cause the decryption node to be arranged to: successfully decrypt, with the PBE key, the PBE ciphertext to produce the ABE package if and only if the second set of PBE attributes corresponds to the first set of PBE attributes; separate the ABE package into the ABE ciphertext and the ABE access control expression; and successfully decrypt, with the first cryptographic key and the second cryptographic key, the ABE ciphertext to produce the plaintext if and only if the third ABE attribute subset and the fourth ABE attribute subset satisfy the ABE access control expression.

In Example 11, the subject matter of Example 10 optionally includes, wherein the ABE access control expression is a Boolean expression with Boolean operators over the set of ABE attributes.

In Example 12, the subject matter of Example 11 optionally includes, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

In Example 13, the subject matter of any one or more of Examples 10-12 optionally include, wherein the second set of PBE attributes corresponds to the first set of PBE attributes when the second set of PBE attributes is identical to the first set of PBE attributes.

In Example 14, the subject matter of any one or more of Examples 9-13 optionally include, wherein the universe of PBE attributes corresponds to a hierarchy of security clearance levels.

In Example 15, the subject matter of any one or more of Examples 9-14 optionally include, wherein each ABE authority is a respective military unit comprising a respective set of nodes, and wherein each node in the respective set of nodes corresponds to a respective computing device for use by a respective soldier within the respective military unit.

In Example 16, the subject matter of any one or more of Examples 13-15 optionally include, wherein the first set of PBE attributes comprises: a first subset of PBE attributes from the first universe of PBE attributes defined by the first PBE authority; and a second subset of PBE attributes from a second universe of PBE attributes defined by a second PBE authority; and wherein the second set of PBE attributes comprises: a third subset of PBE attributes from the first universe of PBE attributes defined by the first PBE authority; and a fourth subset of PBE attributes from the second universe of PBE attributes defined by the second PBE authority.

Example 17 is a method for cryptographically secure cross-domain information sharing, the method performed by an encryption node, the method comprising: encrypting, using ABE (attribute-based encryption), plaintext to produce ABE ciphertext, the ABE encryption using an ABE access control expression defined with a set of ABE attributes comprising: a first ABE attribute subset from a first universe of ABE attributes defined by a first ABE authority of a first information domain; and a second ABE attribute subset from a second universe of ABE attributes, the second universe of ABE attributes defined by a second ABE authority of a second information domain; combining the ABE ciphertext with the ABE access control expression to produce an ABE package; and encrypting, using PBE (predicate-based encryption), the ABE package to produce a PBE ciphertext, the PBE encryption using a first set of PBE attributes from a universe of PBE attributes defined by a PBE authority.

In Example 18, the subject matter of Example 17 optionally includes, wherein a decryption node is assigned: a first cryptographic key from the first ABE authority, the first cryptographic key corresponding to a third ABE attribute subset assigned to the decryption node by the first ABE authority; a second cryptographic key from the second ABE authority, the second cryptographic key corresponding to a fourth ABE attribute subset assigned to the decryption node by the second ABE authority; and a PBE key from the PBE authority, the PBE key corresponding to a second set of PBE attributes assigned to the decryption node by the PBE authority; and wherein the decryption node performs operations comprising: successfully decrypting, using the PBE key, the PBE ciphertext producing the ABE package if and only if the second set of PBE attributes corresponds to the first set of PBE attributes; separating the ABE package into the ABE ciphertext and the ABE access control expression; and successfully decrypting, using the first cryptographic key and the second cryptographic key, the ABE ciphertext producing the plaintext if and only if the third ABE attribute subset and the fourth ABE attribute subset satisfy the ABE access control expression.

In Example 19, the subject matter of Example 18 optionally includes, wherein the ABE access control expression is a Boolean expression with Boolean operators over the set of ABE attributes.

In Example 20, the subject matter of Example 19 optionally includes, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

In Example 21, the subject matter of any one or more of Examples 18-20 optionally include, wherein the second set of PBE attributes corresponds to the first set of PBE attributes when the second set of PBE attributes is identical to the first set of PBE attributes.

In Example 22, the subject matter of any one or more of Examples 17-21 optionally include, wherein the universe of PBE attributes corresponds to a hierarchy of security clearance levels.

In Example 23, the subject matter of any one or more of Examples 17-22 optionally include, wherein each ABE authority is a respective military unit comprising a respective set of nodes, and wherein each node in the respective set of nodes corresponds to a respective computing device for use by a respective soldier within the respective military unit.

In Example 24, the subject matter of any one or more of Examples 21-23 optionally include, wherein the first set of PBE attributes comprises: a first subset of PBE attributes from the first universe of PBE attributes defined by the first PBE authority; and a second subset of PBE attributes from a second universe of PBE attributes defined by a second PBE authority; and wherein the second set of PBE attributes comprises: a third subset of PBE attributes from the first universe of PBE attributes defined by the first PBE authority; and a fourth subset of PBE attributes from the second universe of PBE attributes defined by the second PBE authority.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A system for cryptographically secure cross-domain information sharing, the system comprising:
    a first information domain including a first attribute-based encryption (ABE) authority, the first ABE authority arranged to define a first universe of ABE attributes;
    an encryption node arranged to:
        perform ABE encryption on plaintext to produce ABE ciphertext, the ABE encryption using an ABE access control expression defined with a set of ABE attributes comprising a first ABE attribute subset from the first universe of ABE attributes and second ABE attribute subset from a second universe of ABE attributes, the second universe of ABE attributes defined by a second ABE authority of a second information domain;
        combine the ABE ciphertext with the ABE access control expression to produce an ABE package; and
        perform predicate-based encryption (PBE) on the ABE package to produce a PBE ciphertext, the PBE encryption using a first set of PBE attributes from a universe of PBE attributes defined by a PBE authority; and
    a decryption node assigned:
        a first cryptographic key from the first ABE authority, the first cryptographic key corresponding to a third ABE attribute subset assigned to the decryption node by the first ABE authority;
        a second cryptograhic key from the second ABE authority, the second cryptographic key corresponding to a fourth ABE attribute subset assigned to the decryption node by the second ABE authority; and
        a PBE key from the PBE authority, the PBE key corresponding to a second set of PBE attributes assigned to the decryption node by the PBE authority; and
    wherein the decryption node is arranged to:
        successfully decrypt, with the PBE key, the PBE ciphertext to produce the ABE package if and only if the second set of PBE attributes corresponds to the first set of PBE attributes;
        separate the ABE package into the ABE ciphertext and the ABE access control expression; and
        successfully decrypt, with the first cryptographic key and the second cryptographic key, the ABE ciphertext to produce the plaintext if and only if the third ABE attribute subset and the fourth ABE attribute subset satisfy the ABE access control expression,
        wherein at least one of the first ABE authority, the second ABE authority, the PBE authority, the encryption node, or the decryption node comprises a processor and memory connected with the processor and configured to store instructions implemented by the processor to provide the cryptographic secure cross-domain information sharing.

2. The system of claim 1, wherein the ABE access control expression is a Boolean expression with Boolean operators over the set of ABE attributes.

3. The system of claim 2, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

4. The system of claim 1, wherein the second set of PBE attributes corresponds to the first set of PBE attributes when the second set of PBE attributes is identical to the first set of PBE attributes.

5. The system of claim 1, wherein the universe of PBE attributes corresponds to a hierarchy of security clearance levels.

6. The system of claim 1, wherein each ABE authority is a respective military unit comprising a respective set of nodes, and wherein each node in the respective set of nodes corresponds to a respective computing device used by a respective soldier within the respective military unit.

7. The system of claim 4,
    wherein the first set of PBE attributes comprises:
        a first subset of PBE attributes from the first universe of PBE attributes defined by the first PBE authority; and a second subset of PBE attributes from a second universe of PBE attributes defined by a second PBE authority; and wherein the second set of PBE attributes comprises:
a third subset of PBE attributes from the first universe of PBE attributes defined by the first PBE authority; and
a fourth subset of PBE attributes from the second universe of PBE attributes defined by the second PBE authority.

8. A non-transitory, machine-readable medium comprising instructions which, when executed by a machine, cause the machine to:
encrypt, with ABE (attribute-based encryption), plaintext to produce ABE ciphertext, the ABE encryption using an ABE access control expression defined with a set of ABE attributes comprising:
a first ABE attribute subset from a first universe of ABE attributes defined by a first ABE authority of a first information domain; and
a second ABE attribute subset from a second universe of ABE attributes, the second universe of ABE attributes defined by a second ABE authority of a second information domain;
combine the ABE ciphertext with the ABE access control expression to produce an ABE package; and
encrypt, with PBE (predicate-based encryption), the ABE package to produce a PBE ciphertext, the PBE encryption using a first set of PBE attributes from a universe of PBE attributes defined by a PBE authority,
wherein a decryption node is assigned:
a first cryptographic key from the first ABE authority, the first cryptographic key corresponding to a third ABE attribute subset assigned to the decryption node by the first ABE authority;
a second cryptographic key from the second ABE authority, the second cryptographic key corresponding to a fourth ABE attribute subset assigned to the decryption node by the second ABE authority; and
a PBE key from the PBE authority, the PBE key corresponding to a second set of PBE attributes assigned to the decryption node by the PBE authority; and
wherein another non-transitory, machine-readable medium comprises instructions which, when executed by the decryption node, cause the decryption node to be arranged to:
successfully decrypt, with the PBE key, the PBE ciphertext to produce the ABE package if and only if the second set of PBE attributes corresponds to the first set of PBE attributes;
separate the ABE package into the ABE ciphertext and the ABE access control expression; and
successfully decrypt, with the first cryptographic key and the second cryptographic key, the ABE ciphertext to produce the plaintext if and only if the third ABE attribute subset and the fourth ABE attribute subset satisfy the ABE access control expression.

9. The non-transitory, machine-readable medium of claim 8, wherein the ABE access control expression is a Boolean expression with Boolean operators over the set of ABE attributes.

10. The non-transitory, machine-readable medium of claim 9, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

11. The non-transitory, machine-readable medium of claim 8, wherein the second set of PBE attributes corresponds to the first set of PBE attributes when the second set of PBE attributes is identical to the first set of PBE attributes.

12. The non-transitory, machine-readable medium of claim 8, wherein the universe of PBE attributes corresponds to a hierarchy of security clearance levels.

13. The non-transitory, machine-readable medium of claim 8, wherein each ABE authority is a respective military unit comprising a respective set of nodes, and wherein each node in the respective set of nodes corresponds to a respective computing device used by a respective soldier within the respective military unit.

14. The non-transitory, machine-readable medium of claim 11, wherein the first set of PBE attributes comprises:
a first subset of PBE attributes from the first universe of PBE attributes defined by the first PBE authority; and
a second subset of PBE attributes from a second universe of PBE attributes defined by a second PBE authority; and wherein the second set of PBE attributes comprises:
a third subset of PBE attributes from the first universe of PBE attributes defined by the first PBE authority; and
a fourth subset of PBE attributes from the second universe of PBE attributes defined by the second PBE authority.

15. A method for cryptographically secure cross-domain information sharing, the method performed by an encryption node, the method comprising:
encrypting, using ABE (attribute-based encryption), plaintext to produce ABE ciphertext, the ABE encryption using an ABE access control expression defined with a set of ABE attributes comprising:
a first ABE attribute subset from a first universe of ABE attributes defined by a first ABE authority of a first information domain; and
a second ABE attribute subset from a second universe of ABE attributes, the second universe of ABE attributes defined by a second ABE authority of a second information domain;
combining the ABE ciphertext with the ABE access control expression to produce an ABE package; and
encrypting, using PBE (predicate-based encryption), the ABE package to produce a PBE ciphertext, the PBE encryption using a first set of PBE attributes from a universe of PBE attributes defined by a PBE authority,
wherein a decryption node is assigned:
a first cryptographic key from the first ABE authority, the first cryptographic key corresponding to a third ABE attribute subset assigned to the decryption node by the first ABE authority;
a second cryptographic key from the second ABE authority, the second cryptographic key corresponding to a fourth ABE attribute subset assigned to the decryption node by the second ABE authority; and
a PBE key from the PBE authority, the PBE key corresponding to a second set of PBE attributes assigned to the decryption node by the PBE authority; and
wherein the decryption node performs operations comprising:
successfully decrypting, using the PBE key, the PBE ciphertext producing the ABE package if and only if the second set of PBE attributes corresponds to the first set of PBE attributes;
separating the ABE package into the ABE ciphertext and the ABE access control expression; and successfully decrypting, using the first cryptographic key and the second cryptographic key, the ABE ciphertext producing the plaintext if and only if the third ABE attribute subset and the fourth ABE attribute subset satisfy the ABE access control expression.

16. The method of claim 15, wherein the ABE access control expression is a Boolean expression with Boolean operators over the set of ABE attributes.

17. The method of claim 16, wherein the third ABE attribute subset and the fourth ABE attribute subset satisfy the ABE access control expression if and only if the Boolean expression, evaluated over a combination of the third ABE attribute subset and the fourth ABE attribute subset, evaluates to true.

* * * * *

UNITED STATES PATENT AND TRADEMARK OFFICE
CERTIFICATE OF CORRECTION

PATENT NO. : 9,894,043 B2
APPLICATION NO. : 14/958089
DATED : February 13, 2018
INVENTOR(S) : Khoury et al.

Page 1 of 1

It is certified that error appears in the above-identified patent and that said Letters Patent is hereby corrected as shown below:

On the Title Page

On page 2, in Column 2, under "Other Publications", Line 24, delete "identity-base" and insert --identity-based-- therefor In the Specification In Column 10, Line 26, delete "1" and insert --l-- therefor In Column 10, Line 44, delete "1" and insert --l-- therefor In the Claims In Column 18, Line 17, in Claim 1, delete "cryptograhic" and insert --cryptographic-- therefor Signed and Sealed this
Fourth Day of June, 2019

Andrei Iancu
*Director of the United States Patent and Trademark Office*